United States Patent
Zumbrum et al.

(10) Patent No.: US 11,097,235 B2
(45) Date of Patent: Aug. 24, 2021

(54) SHAKER FLASK STAND WITH COMPOSITE LEGS

(71) Applicant: Sartorius Stedim North America, Inc., Bohemia, NY (US)

(72) Inventors: Michael A. Zumbrum, New Oxford, PA (US); William Kimmick, Bohemia, NY (US); Kevin Perdue, Bohemia, NY (US)

(73) Assignee: Sartorius Stedim North America Inc., Bohemia, NY (US)

( * ) Notice: Subject to any disclaimer, the term of this patent is extended or adjusted under 35 U.S.C. 154(b) by 174 days.

(21) Appl. No.: 16/519,344

(22) Filed: Jul. 23, 2019

(65) Prior Publication Data

US 2021/0023517 A1    Jan. 28, 2021

(51) Int. Cl.
*B29C 69/02* (2006.01)
*B01F 11/00* (2006.01)
(Continued)

(52) U.S. Cl.
CPC .... *B01F 11/0008* (2013.01); *B01F 15/00746* (2013.01); *B01L 9/00* (2013.01); *B29C 69/02* (2013.01); *B33Y 10/00* (2014.12); *B01F 2215/0037* (2013.01); *B01L 2300/123* (2013.01); *B29K 2071/00* (2013.01); *B29K 2075/00* (2013.01); *B29K 2083/005* (2013.01); *B29K 2105/0058* (2013.01)

(58) Field of Classification Search
CPC combination set(s) only.
See application file for complete search history.

(56) References Cited

U.S. PATENT DOCUMENTS 303,833 A * 8/1884 Gerard .................... A47F 5/112
                                                                  248/152
558,433 A * 4/1896 Stoddard ................ A47F 5/112
                                                                  248/152
(Continued)

FOREIGN PATENT DOCUMENTS

WO        2014116997        7/2014

OTHER PUBLICATIONS

International Search Report and Written Opinion for PCT/US2020/043030, dated Aug. 31, 2020, 10 pgs.
(Continued)

*Primary Examiner* — Monica E Millner
(74) *Attorney, Agent, or Firm* — Womble Bond Dickinson (US) LLP

(57) ABSTRACT

A flask stand is configured to support a flask and includes a base ring and a plurality of legs. The base ring is configured to support a lower portion of the flask. Each leg is secured to the base ring and extends outward from the base ring. Each leg includes a body, a lattice, and an elastomeric foot. The body includes a first end portion that is secured to the base ring with the foot portion being opposite the first end portion. The lattice is formed within the foot portion and includes a plurality of members that form an open-mesh frame that defines a plurality of voids between adjacent members of the frame. The elastomeric foot is formed of an elastomer and is disposed about the lattice and within the voids of the lattice. The foot is configured to engage a surface to support the body relative to the surface.

20 Claims, 12 Drawing Sheets

(51) Int. Cl.
  *B33Y 10/00* (2015.01)
  *B01F 15/00* (2006.01)
  *B01L 9/00* (2006.01)
  *B29K 75/00* (2006.01)
  *B29K 83/00* (2006.01)
  *B29K 105/00* (2006.01)
  *B29K 71/00* (2006.01)

(56) References Cited

U.S. PATENT DOCUMENTS

| | | | | |
|---|---|---|---|---|
| 793,463 | A | * | 6/1905 | McDonald ............ F16J 15/3232 |
| | | | | 277/562 |
| 1,805,623 | A | | 5/1931 | Hammer |
| 2,926,879 | A | * | 3/1960 | Dietrich .................. A47J 45/00 |
| | | | | 248/311.2 |
| 3,229,949 | A | * | 1/1966 | Chaconas ............. F17C 13/086 |
| | | | | 248/346.11 |
| 3,341,211 | A | * | 9/1967 | Houghton ................ F16J 15/20 |
| | | | | 277/530 |
| 3,445,024 | A | | 5/1969 | Whitney |
| 4,759,523 | A | * | 7/1988 | Yakulis, Jr. ............... B01L 9/00 |
| | | | | 211/71.01 |
| 4,971,276 | A | | 11/1990 | Tannenbaum |
| 5,154,380 | A | * | 10/1992 | Risca ................... A47G 23/0216 |
| | | | | 248/154 |
| 5,165,703 | A | | 11/1992 | Morvant |
| 5,309,670 | A | * | 5/1994 | Bates ........................ A47G 7/02 |
| | | | | 248/346.11 |
| 5,615,896 | A | | 4/1997 | Morvant |
| 6,045,017 | A | * | 4/2000 | Connell .................... A45F 5/02 |
| | | | | 224/148.4 |
| 6,102,352 | A | * | 8/2000 | Kvalvog ................. A47G 23/03 |
| | | | | 248/346.11 |
| 6,863,278 | B2 | * | 3/2005 | Morvant ................ F16J 15/166 |
| | | | | 277/584 |
| 7,216,837 | B2 | * | 5/2007 | Pineda .................... A47G 7/025 |
| | | | | 248/104 |
| 7,628,433 | B2 | * | 12/2009 | Schwartz .................. B01L 9/00 |
| | | | | 294/27.1 |
| 7,726,621 | B1 | * | 6/2010 | Dellinger ................. B44D 3/14 |
| | | | | 248/346.5 |
| 8,087,528 | B1 | * | 1/2012 | Scarlett .............. A47G 23/0216 |
| | | | | 220/23.89 |
| 8,721,993 | B2 | | 5/2014 | Lockwood et al. |
| 8,876,367 | B1 | | 11/2014 | Howe et al. |
| 9,408,488 | B2 | * | 8/2016 | Bizzarri ................. A47G 23/03 |
| D772,020 | S | * | 11/2016 | Gunal .......................... D7/624.1 |
| D861,995 | S | * | 10/2019 | Lentz .......................... D30/121 |
| 10,940,086 | B2 | * | 3/2021 | Gitman .................. A61J 1/2055 |
| 2004/0021048 | A1 | * | 2/2004 | Schaal ................... B60N 3/108 |
| | | | | 248/310 |
| 2017/0342797 | A1 | | 11/2017 | Murphree et al. |
| 2018/0071979 | A1 | | 3/2018 | Achten et al. |
| 2019/0211700 | A1 | | 7/2019 | Munson |
| 2019/0247278 | A1 | | 8/2019 | Gitman |
| 2021/0024255 | A1 | * | 1/2021 | Zumbrum ................. B33Y 80/00 |

OTHER PUBLICATIONS

Office Action for U.S. Appl. No. 16/519,342, dated Oct. 9, 2020, 20 pgs.
International Search Report and Written Opinion for PCT/US2020/043032, dated Oct. 19, 2020, 6 pgs.
Office Action (Non-Final) in U.S. Appl. No. 16/519,342, filed Jul. 23, 2019 dated Apr. 22, 2020.
Zumbrum, Michael A.; Composite Articles of Lattice Reinforced Elastomers; U.S. Appl. No. 16/519,342, filed Jul. 23, 2019.

* cited by examiner

SHAKER FLASK STAND WITH COMPOSITE LEGS

BACKGROUND

1. Technical Field

The present disclosure relates to composite articles and, more specifically, to a shaker flask stand including composite legs.

2. Discussion of Related Art

Molded elastomers are used in a variety of applications including, but not limited to, gaskets, handles, non-slip feet, and caps or lids for containers. To form some molded elastomeric articles, an elastomer may be placed into a mold to form an article entirely out of the elastomer. Molded elastomeric articles formed entirely out of an elastomer can lack rigidity, deform, and/or elongate when under tension or compression.

Some molded elastomeric articles include an internal frame or structure that can provide additional rigidity to the molded elastomeric article. To form molded elastomeric articles, the internal frame or structure can be formed, inserted within a mold, and then overmolded with an elastomer. Generally, after the internal frame or structure is formed and before it is overmolded with the elastomer, the internal frame or structure is surface treated to enhance adhesion of the elastomer to the internal frame or structure. In some instances, the elastomer can peel from the frame when compressed or under tension. This peeling may occur after a single load cycle and may increase over subsequent load cycles.

SUMMARY

There is a continuing need for composite articles with enhanced rigidity and/or increased toughness. In addition, when a composite article includes an overmolded frame, there is a continuing need for composite articles with improved peel resistance. Further, there is always a need for reducing manufacturing steps and/or reducing manufacturing costs of composite articles.

In an embodiment of the present disclosure, a composite article includes a lattice structure and an elastomeric section. The lattice structure is formed by additive manufacturing methods includes a plurality of members that form an open-mesh frame defining a plurality of voids between adjacent members of the frame. The elastomeric section is formed of an elastomer that is disposed at least partially about the lattice structure and within the voids of the lattice structure.

In some embodiments, the lattice structure is monolithically formed. The each void of the plurality of voids sized in a range of 0.05 mm to 5 mm. The elastomeric section may include a thermoset elastomer or a thermoplastic elastomer. The elastomeric section may include silicone or may include a block polymer of styrene-isobutylene-styrene or a thermoplastic polyurethane.

In embodiments, the article forms a gasket and includes a body that is integrally formed with the lattice structure. The body may form a ring and the lattice structure may extend inward from an inner surface of the ring. The elastomeric section may include a flange that extends inward form the lattice structure. The elastomeric section may include a rib that has a thickness greater than the flange. The rib may be disposed between the flange and the body.

In some embodiments, the elastomeric section extends over the body. The body may be monolithically formed with the lattice structure. The body may include one or more grips that extend in a direction away from a surface thereof.

In certain embodiments, the article includes a base ring, a plurality of flask arms, and a leg. The base ring may be configured to support a lower portion of a flask. Each flask arm may be configured to extend from the base ring to secure the lower portion of the flask to the base ring. The leg may extend outward from the base ring and includes a body that is integrally formed with the lattice structure. The elastomeric section may form a foot of the leg and be configured to engage a surface to support the leg relative to the surface.

In particular embodiments, the article is a circular gasket, a gasket with a grip, a rectangular gasket, a vessel cap, a flask stand, or a handle for a hand tool.

In an embodiment of the present disclosure, a composite article includes a lattice and an elastomeric section. The lattice includes a plurality of members that form an open-mesh frame defining a plurality of voids between adjacent members of the frame. The elastomeric section is formed of an elastomer disposed about the lattice and within the voids of the lattice.

In some embodiments, the lattice is monolithically formed. The lattice may be formed by additive manufacturing methods. Each void of the plurality of voids may be sized in a range of 0.05 mm to 5 mm. The elastomer of the elastomeric section may be disposed about the entire lattice structure. The elastomeric section may include a thermoset elastomer or a thermoplastic elastomer. The elastomeric section may include silicone or may include a block polymer of styrene-isobutylene-styrene or a thermoplastic polyurethane.

In embodiments, the article forms a gasket and includes a body that is integrally formed with the lattice. The body may form a ring and the lattice may extend inward from an inner surface of the ring. The elastomeric section may include a flange that extends inward form the lattice. The elastomeric section may include a rib that has a thickness greater than the flange. The rib may be disposed between the flange and the body.

In some embodiments, the elastomeric section extends over the body. The body may be monolithically formed with the lattice. The body may include one or more grips that extend in a direction away from a surface thereof.

In certain embodiments, the article includes a base ring, a plurality of flask arms, and a leg. The base ring may be configured to support a lower portion of a flask. Each flask arm may be configured to extend from the base ring to secure the lower portion of the flask to the base ring. The leg may extend outward from the base ring and includes a body that is integrally formed with the lattice. The elastomeric section may form a foot of the leg and be configured to engage a surface to support the leg relative to the surface.

In particular embodiments, the article is a circular gasket, a gasket with a grip, a rectangular gasket, a vessel cap, a flask stand, or a handle for a hand tool.

In another embodiment of the present disclosure, a method of manufacturing a composite article includes positioning a lattice within a cavity of a mold and flowing an elastomer into the cavity of the mold with the elastomer flowing through voids of the lattice and about the lattice. The lattice includes a plurality of members that form an open-mesh frame and defines a plurality of voids between adjacent members of the frame. The method may include allowing the elastomer to solidify into its final shape within the voids and at least partially about the lattice.

In embodiments, the method includes additively manufacturing the lattice. The method may include three-dimensionally printing the lattice. Three-dimensionally printing the lattice may include the lattices comprising a cross-linked cyanate ester or a cross-linked polyurethane. Positioning the lattice within the cavity of the mold may include the plurality of voids sized in a range of 0.05 mm to 5 mm.

In some embodiments, flowing the elastomer into the cavity of the mold occurs without the lattice being surface treated. Flowing the elastomer into the cavity may form at least one of a circular gasket, a gasket with a grip, a rectangular gasket, a vessel cap, a portion of a flask stand, or a handle for a hand tool. Flowing the elastomer may include flowing a liquid elastomer such as a liquid silicone or a liquid perfluoropolyether.

In another embodiment of the present disclosure, a flask stand that is configured to support a flask includes a base ring and a plurality of legs. The base ring is configured to support a lower portion of the flask. Each leg is secured to the base ring and extends outward from the base ring. Each leg includes a body, a lattice, and an elastomeric foot. The body includes a first end portion that is secured to the base ring. The foot portion is opposite the first end portion. The lattice is formed within the foot portion and includes a plurality of members that form an open-mesh frame that defines a plurality of voids between adjacent members of the frame. The elastomeric foot is formed of an elastomer and is disposed about the lattice and within the voids of the lattice. The foot is configured to engage a surface to support the body relative to the surface.

In embodiments, the first end portion includes an attachment tab. The attachment tab is secured to the leg of the base ring. The plurality of legs may include four legs. The body and the lattice of each leg may be monolithically formed. Each void of the lattice may be sized in a range of 0.05 mm to 5 mm. The elastomeric section may include a thermoset elastomer or a thermoplastic elastomer.

In some embodiments, the flask stand includes a plurality of flask arms. Each flask arm may extend from the base ring and be configured to secure the lower portion of the flask to the base ring.

In another embodiment of the present disclosure, a method of manufacturing a flask stand including positing a leg that includes a boy and a lattice within a cavity of a mold with at least the lattice disposed within the mold. The lattice includes a plurality of members that form an open-mesh frame that defines a plurality of voids between the adjacent members of the frame. The method also includes flowing an elastomer into the cavity of the mold with the elastomer flowing through the voids of the lattice and about the lattice.

In embodiments, the method includes additively manufacturing the lattice or the body. The lattice and the body may be additively manufactured as a monolithic structure. The method may include three-dimensionally printing the body and the lattice. Three-dimensionally printing the lattice may include the lattice comprising a cross-linked cyanate ester or a cross-linked polyurethane.

In some embodiments, positioning the lattice within the cavity of the mold includes the plurality of voids being sized in a range of 0.05 mm to 5 mm. Flowing the elastomer into the cavity of the mold occurs without the lattice being surface treated. Flowing the elastomer may include flowing a liquid elastomer such as liquid silicone or a liquid perfluoropolyether.

In certain embodim Finalize application and drawings; prepare utility transmittal and application data sheet; confirm inventors with client; notes to attorneyents, the method includes securing the leg to a base ring. Securing the leg to the base ring may include inserting an attachment tab of the leg into a recess defined in the base ring.

Further, to the extent consistent, any of the aspects described herein may be used in conjunction with any or all of the other aspects described herein.

BRIEF DESCRIPTION OF THE DRAWINGS

Various aspects of the present disclosure are described hereinbelow with reference to the drawings, which are incorporated in and constitute a part of this specification, wherein.

DETAILED DESCRIPTION

Figure 1:
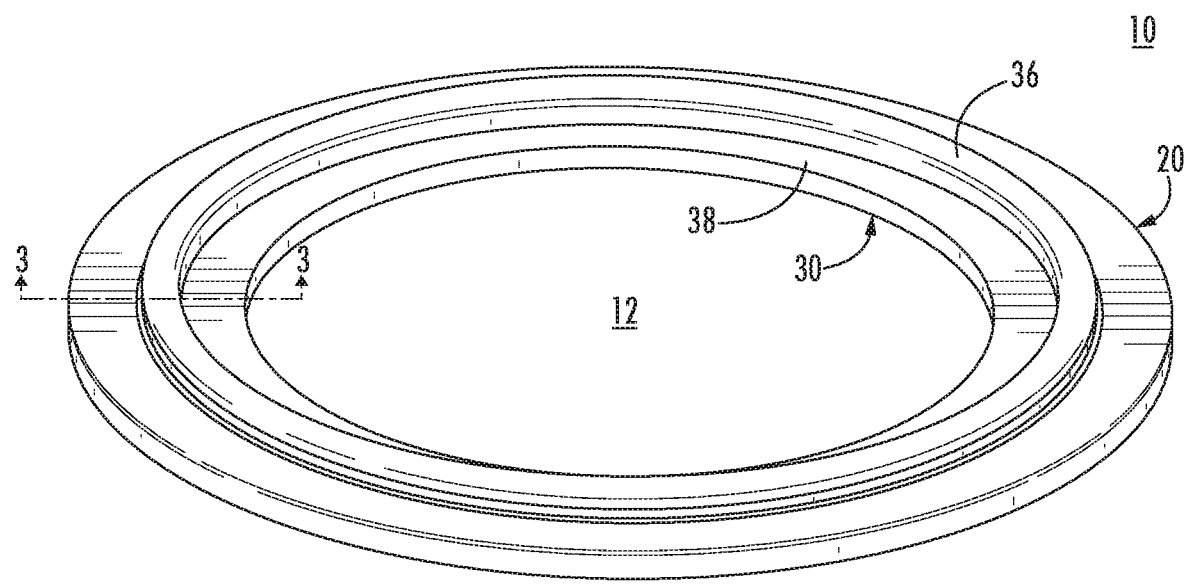
FIG. 1 is a perspective view of an elastomeric gasket provided in accordance with an embodiment of the present disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. Also, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

Figure 2:
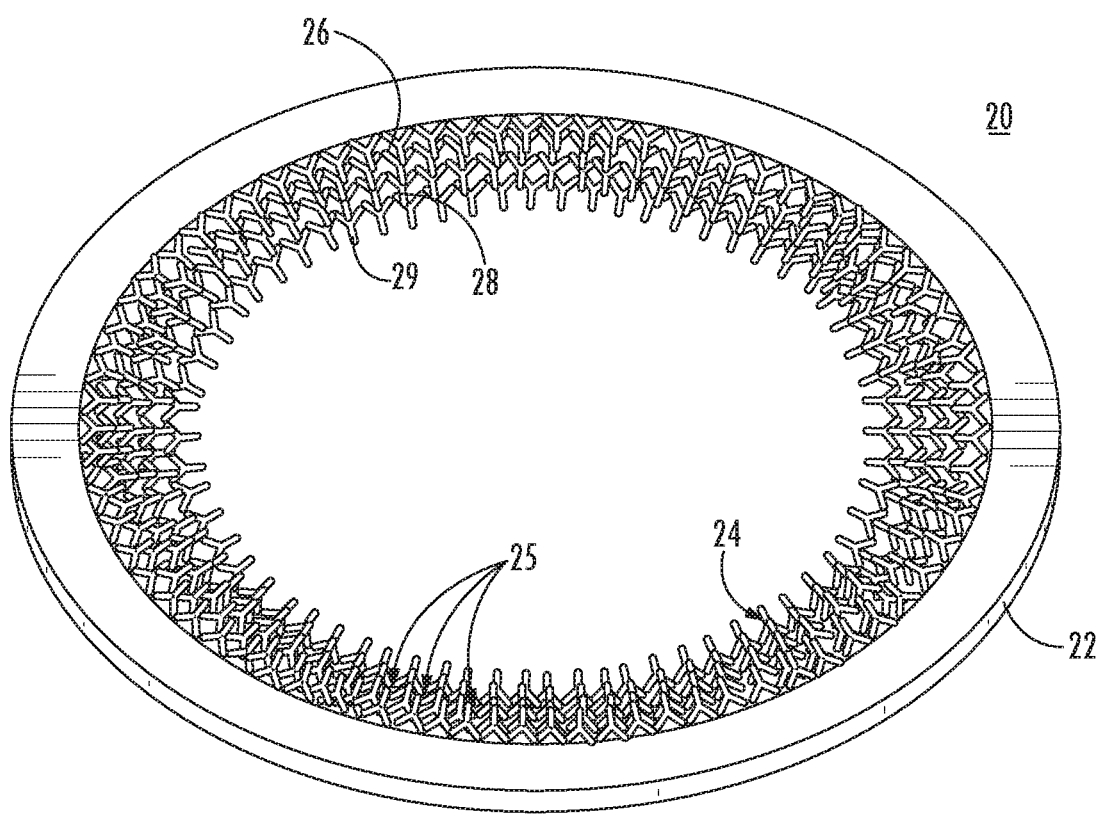
FIG. 2 is a perspective view of a body of the gasket of FIG. 1.

Referring now to FIGS. 1 and 2, a composite gasket 10 is provided in accordance with an embodiment of the present disclosure. The gasket 10 includes a frame 20 and an elastomeric section 30. The frame 20 is provided to increase rigidity of the gasket 10 or increase retention of the gasket 10 when compared to a gasket formed entirely of a molded elastomer. The frame 20 may be rigid or may be flexible. The frame 20 may be formed of a thermoplastic, a polysulfone, a polyether ether ketone, a thermoset, or a metal. For example, suitable thermoplastics may include polyamides, suitable thermosets may include acrylics, polyurethanes, or cyanate esters, and suitable metals may include stainless steel, copper, and aluminum.

With particular reference to FIG. 2, the frame 20 includes a body 22 and a lattice 24. The body 22 forms a ring with the lattice 24 extending inward from an inner surface of the ring. The body 22 and the lattice 24 are integrally formed with one another. In some embodiments, the body 22 and the lattice 24 are monolithically formed with one another. For example, the body 22 and the lattice 24 may be formed through an additive manufacturing process, e.g., three-dimensional printing. The body 22 is substantially solid and may be exposed to an external environment after overmolding. Specifically, portions of or the entire body 22 may not be overmolded with an elastomer. Alternatively, portions of or the entire body 22 may be overmolded with an elastomer.

The lattice 24 forms an open cell structure and is configured to be overmolded with an elastomer to form the elastomeric section 30 thereabout. The lattice 24 is formed by a plurality of members or arms that form an open-mesh frame. The lattice 24 defines a plurality of openings or voids 25 between adjacent arms throughout. The arms may be cylindrical with a circular cross-section or may have a triangular, rectangular, pentagonal, hexagonal, or other polygonal cross-section. The arms may from an open cubic frame, an open pyramidal frame, or other open frame. The voids 25 are sized to allow an elastomer to flow through the voids 25 of the lattice 24 and to solidify or harden within and about the lattice 24. In embodiments, the voids 25 may be sized in a range of 0.05 mm to 5 mm.

The lattice 24 may define a rib segment 26 adjacent the body 22 and a flange segment 28 extending from the rib segment 26 away from the body 22. The rib segment 26 may have a thickness greater than the flange segment 28. In certain embodiments, the lattice 24 may include a tapered end 29 in the flange segment 28 away from the body 22. In some embodiments, the lattice 24 has a substantially uniform thickness from the body 22 to an end 29 of the lattice 24.

Figure 3:
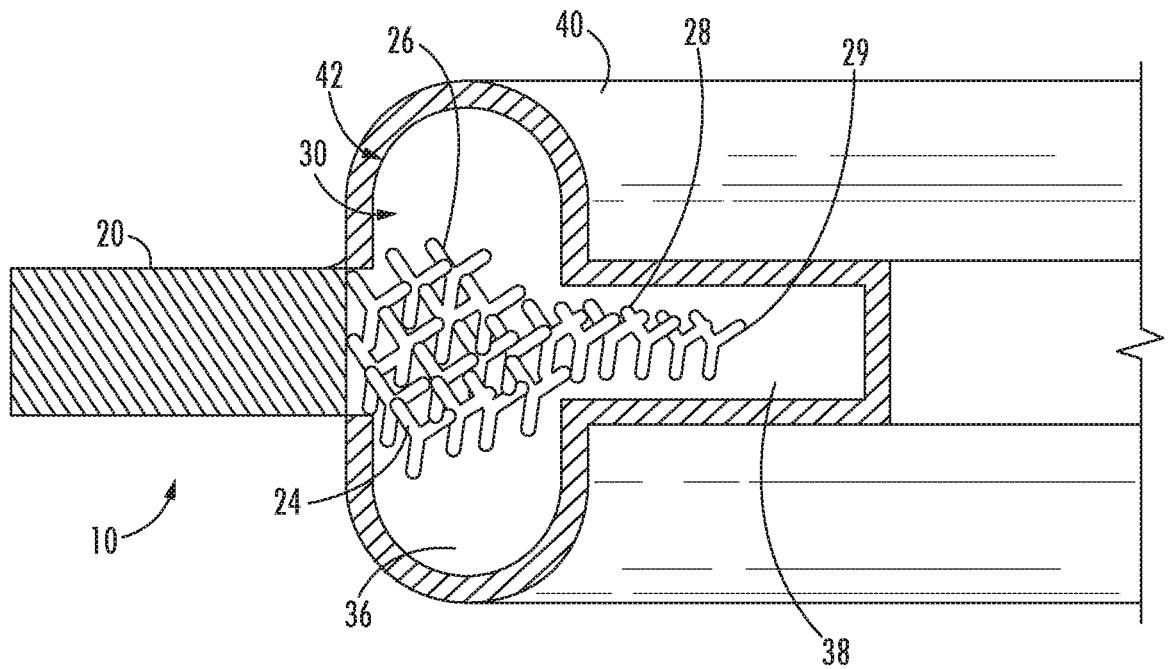
FIG. 3 is a cross-sectional view taken along the section line 3-3 of FIG. 1.

With additional reference to FIG. 3, to form the elastomeric section 30 about the lattice 24, a mold 40 is secured about the lattice 24 with the lattice 24 disposed within a cavity 42 defined by the mold 40. As shown, the mold 40 forms a seal with the body 22 with the body 22 outside of the cavity 42. In some embodiments, a portion of or the entire body 22 may be disposed within the cavity 42 of the mold 40.

When the elastomeric section 30 is molded over the lattice 24, the elastomeric section 30 includes a rib 36 and a flange 38. The dimensions of the rib 36 and the flange 38 are determined by the cavity 42 of the mold 40. The elastomeric section 30 may include a rib 36 even when the lattice 24 has a substantially uniform thickness from the body to an end 29 of the lattice 24, i.e., when the lattice 24 does not include a rib segment 26.

Figure 4:
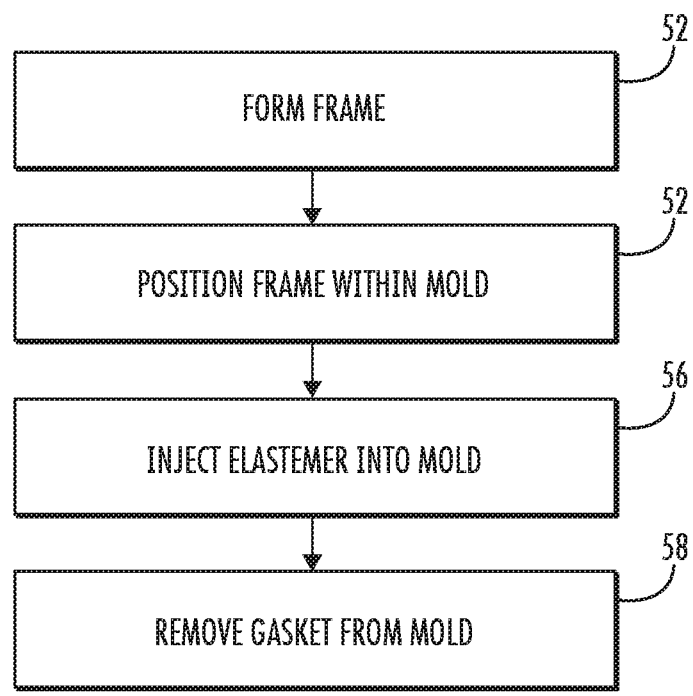
FIG. 4 is a flow chart of a method of manufacturing the gasket of FIG. 1 in accordance with an embodiment of the present disclosure.

Referring now to FIG. 4, a method of forming a composite article 50 is described in accordance with an embodiment of the present disclosure with reference to the gasket 10 and mold 40 of FIGS. 1-3. While the method 50 is detailed with respect to the gasket 10, the method 50 may be used to form a variety of composite articles including, but not limited to, gaskets, handles, non-slip feet, caps or lids for vessels, or handles for hand tools.

Initially, the frame 20 is formed to a desired shape (Step 52). The desired shape of the frame 20 may be determined by a variety of factors including, but not limited to, a desired shape of the finished composite article, e.g., the gasket 10; a shape of an elastomeric section of the finished article; a desired rigidity of the finished composite article; and other performance factors associated with the finished composite article. The desired shape of the frame 20 includes a shape of the body section 22 and a shape of the lattice 24. The shape of the lattice 24 includes outer dimensions of the lattice 24 and the size of the voids 25 of the lattice 24. The size of the voids 25 of the lattice 24 may be determined based on a complexity of the shape of the lattice 24, an elastomer to comprise the elastomeric section 30, a desired rigidity of the elastomeric section 30, a material forming the lattice 24, and/or desired performance characteristics of the elastomeric section 30. Forming the frame 20 including the lattice 24 can include forming the lattice 24 with additive manufacturing methods. For example, the lattice 24 may be three-dimensionally printed and can be formed of cross-linked cyanate ester or cross-linked polyurethane.

With the frame 20 formed, the frame 20 is positioned within the mold 40 with at least the lattice 24 disposed within the cavity 42 of the mold 40 (Step 54). The elastomer is then injected into the cavity 42 of the mold 40 to overmold at least the lattice 24 of the frame 20 (Step 56). As the elastomer is injected into the mold 40, the elastomer flows around the lattice 24 and through the voids 25 of the lattice 24 such that the elastomer is molded about and within the lattice 24. As elastomer solidifies or hardens within the mold 40, the elastomer may bond to the lattice 24 to form the elastomeric section 30 of the gasket 10. The elastomer may flow through the mold 40 as a liquid such as liquid silicone or liquid perfluoropolyether.

When the elastomer is sufficiently hardened, the gasket 10 is removed from the mold 40 (Step 58). The elastomer may be a thermoset or a thermoplastic. For example, suitable thermoplastic elastomers may include block copolymers of styrene-isobutylene-styrene, Santoprene™, blends of ethylene propylene diene terpolymer (EPDM) and polypropylene, or thermoplastic polyurethanes and suitable thermoset elastomers may include silicones such as silicones (VMQ), phenyl silicone (PMVQ), perfluoro polyether elastomers, polyurethanes, perfluorinated elastomers (FFKM), or fluoroelastomers (FKM).

The lattice 24 provides increased surface area for the elastomer to bond such that the elastomeric section 30 forms an improved bond to the frame 20 when compared to a body 22 without the lattice 24. The improved bond may be the result of enhanced mechanical attachment between the elastomeric section 30 and the frame 20. The improved bond provided by the lattice 24 may improve the durability of the elastomeric section 30 and may improve a peel strength between the lattice 24 and the elastomeric section 30 to reduce the possibility of delaminating between the frame 20 and the elastomeric section 30. In addition, the lattice 24 within the elastomeric section 30 may increase a toughness of the elastomeric section 30. The increased toughness of the elastomeric section 30 may be the result of micro reinforcement provided by the lattice 24 to the elastomeric section 30.

Further, the increased surface area between the elastomer and the lattice 24 may allow for overmolding of the lattice 24 without surface treating the lattice 24. Eliminating a treatment step associated with traditional overmolding may decrease a number of steps to produce composite articles, e.g., gasket 10; and thus, may reduce a cost of overmolded elastomeric articles.

In some embodiments where a portion of the overmolded elastomeric article is compressed, the lattice 24 may improve extrusion resistance of the compressed portion. For example, in use, the flange 38 of the gasket 10 may be compressed between two elements with a pathway 12 (FIG. 1) being formed through the gasket 10. The lattice 24 may improve extrusion resistance of the flange 38 from extruding into the pathway 12 while maintaining a seal between the two elements compressing the flange 38.

Figure 5:
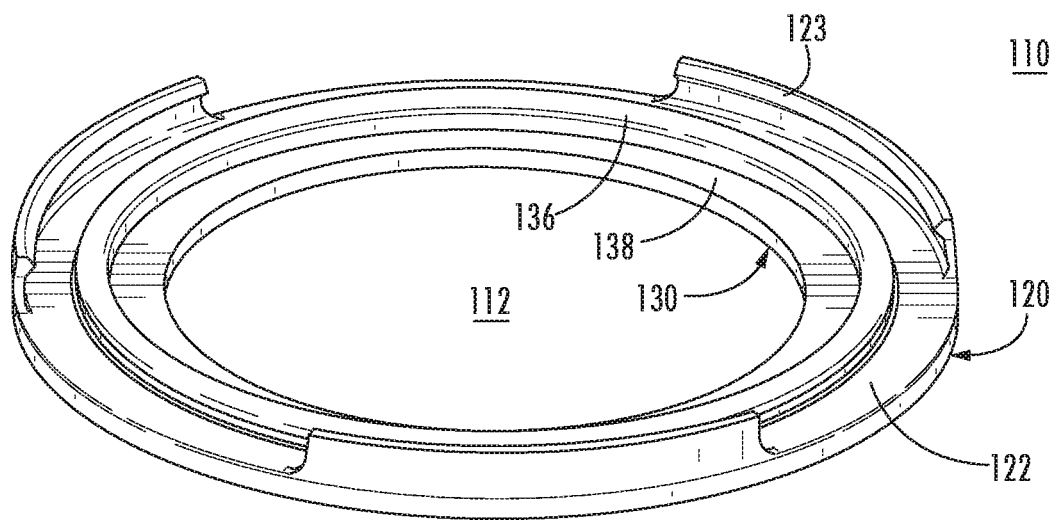
FIG. 5 is a perspective view of another elastomeric gasket provided in accordance with an embodiment of the present disclosure.
Figure 6:
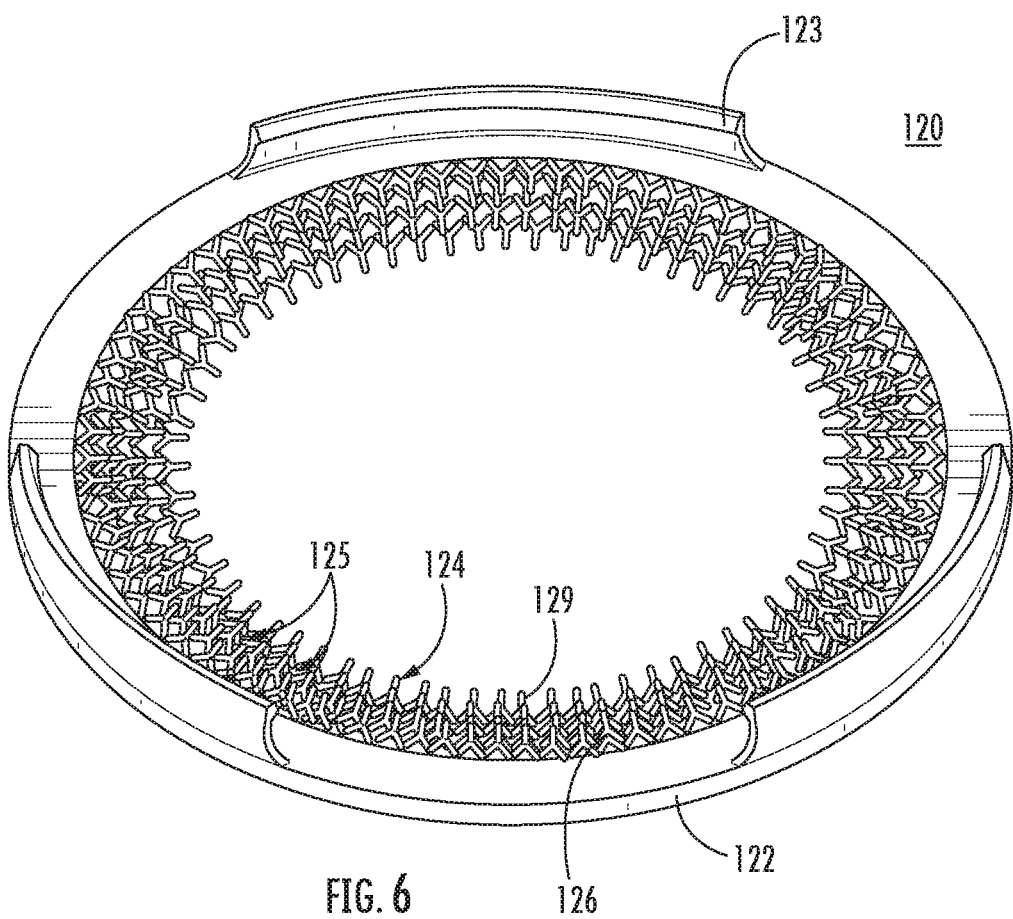
FIG. 6 is a perspective view of a body of the gasket of FIG. 5.

Referring now to FIGS. 5 and 6, another composite gasket 110 is provided in accordance with an embodiment of the present disclosure. The gasket 110 is similar to the gasket 10 detailed above with similar elements having a similar label with a "1" preceding the previous label. For reasons of brevity, only the differences between the gasket 110 and the gasket 10 will be detailed herein. The gasket 110 includes a frame 120 and an elastomeric section 130. The elastomeric section 130 is similar to the elastomeric section 30 detailed above.

With particular reference to FIG. 6, the frame 120 includes a body 122, grips 123, and a lattice 124 that are integrally formed with one another. In some embodiments, the body 122, the grips 123, and the lattice 124 are monolithically formed with one another. For example, the body 122, the grips 123, and the lattice 124 may be formed through an additive manufacturing process, e.g., three-dimensional printing. The body 122 and the grips 123 are substantially solid and may be exposed to an external environment after overmolding. Specifically, portions of or the entire body 122 or the grips 123 may not be overmolded with an elastomer. Alternatively, portions of or the entire body 122 or the entire grips 123 may be overmolded with an elastomer.

The grips 123 may provide surfaces to grasp the gasket 110. The grips 123 may be flexible or may be rigid. The body 122 may include three grips 123 as shown or may include a few as a single grip 123 or more than three grips 123. The grips 123 may extend in a range of 30 degrees to 360 degrees of the circumference of the body 122.

Figure 7:
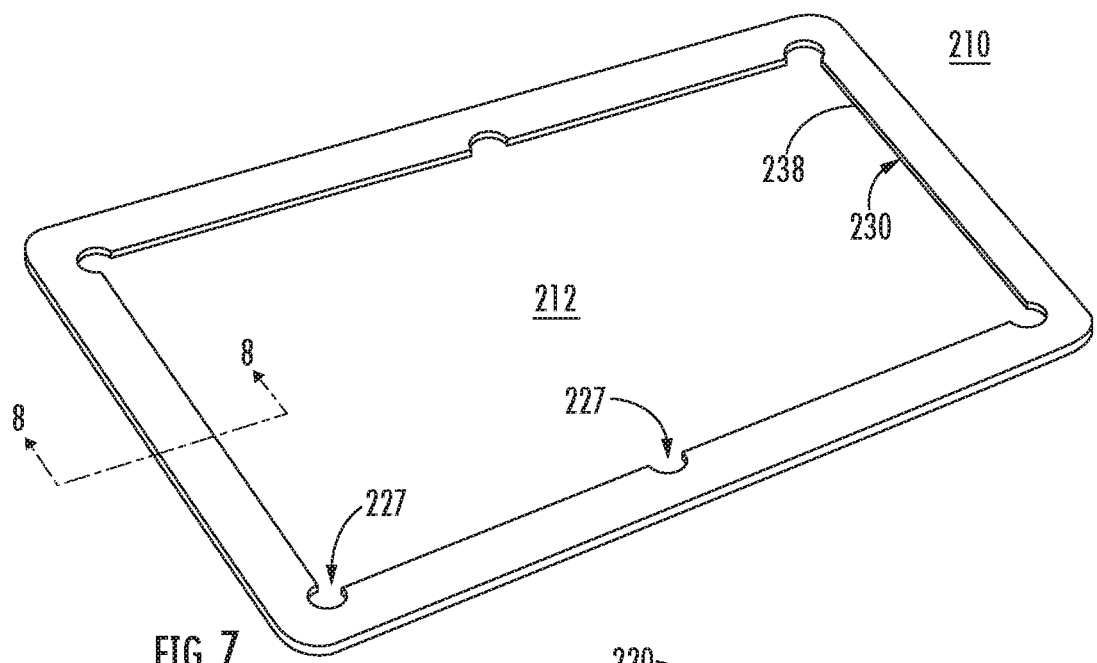
FIG. 7 is a perspective view of another elastomeric gasket provided in accordance with an embodiment of the present disclosure.
Figure 8:
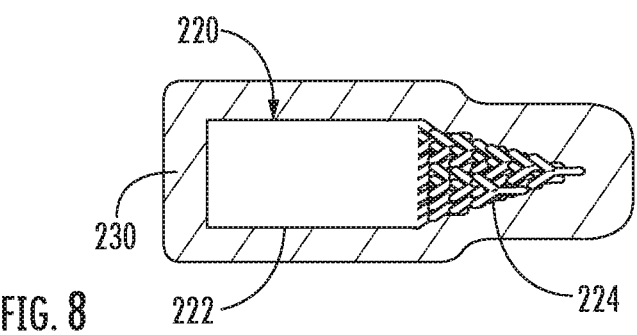
FIG. 8 is a cross-sectional view taken along the section line 8-8 of FIG. 7.
Figure 9:
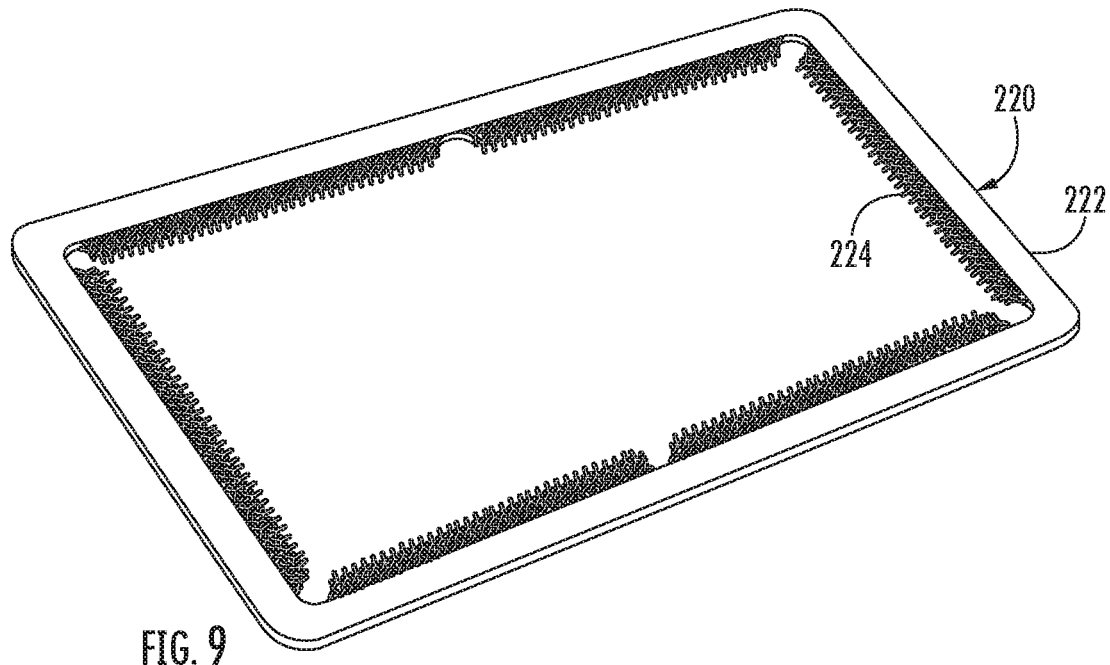
FIG. 9 is a perspective view of the body of the gasket of FIG. 7.

Referring now to FIGS. 7-9, another composite gasket 210 is provided in accordance with an embodiment of the present disclosure. The gasket 210 is similar to the gasket 10 detailed above with similar elements having a similar label with a preceding "2" the previous label. For reasons of brevity, only the differences between the gasket 210 and the gasket 10 will be detailed herein. The gasket 210 includes a frame 220 and an elastomeric section 230. The elastomeric section 230 is similar to the elastomeric section 30 detailed above.

With particular reference to FIGS. 7-9, the frame 220 includes a body 222 and a lattice 224 that are integrally formed with one another. In some embodiments, the body 222 and the lattice 224 are monolithically formed with one another. For example, the body 222 and the lattice 224 may be formed through an additive manufacturing process, e.g., three-dimensional printing. The body 222 is substantially solid and is entirely overmolded by an elastomer. In some embodiment, portions of or the entire body 22 may be exposed to an external environment after overmolding. Specifically, portions of or the entire body 222 may not be overmolded with an elastomer.

The body 222 is forms a rectangular shape with a pathway 212 defined through the body 222. The lattice 224 extends from the body 222 towards the pathway 212 as shown in FIG. 9. The body 222 or the lattice 224 may define recesses 227 adjacent each corner of the body 222 and at one or more points between corners of the body 222. The structure of the lattice 224 is substantially similar to the structure of the lattice 24 detailed above with respect to gasket 10.

Figure 10:
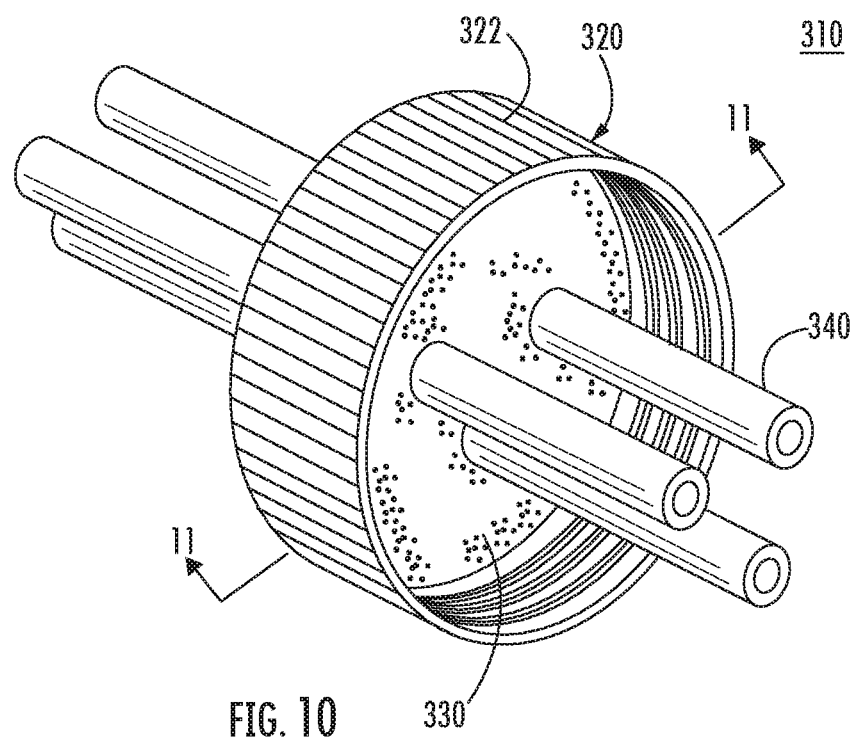
FIG. 10 is a perspective view of a vessel cap provided in accordance with an embodiment of the present disclosure.
Figure 11:
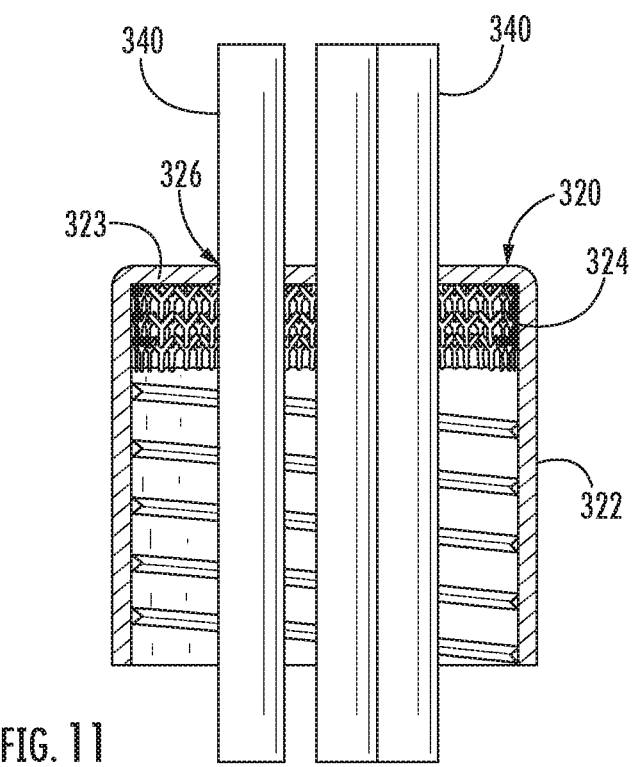
FIG. 11 is a longitudinal cross-sectional view of the vessel cap of FIG. 10.

Referring now to FIGS. 10 and 11, a composite vessel cap 310 is provided in accordance with an embodiment of the present disclosure. The vessel cap 310 includes frame or body 320 and an elastomeric section or seal 330. The body 320 includes a sidewall 322 that a cover 323 at one end of the sidewall 322. The cover 323 is circular or disc shaped with the sidewall 322 circumscribing the circumference of the cover 323 and extending in a direction away from the cover 323. An inner surface of the sidewall 322 may be threaded and configured to thread over a neck of a vessel to close an opening of the vessel passing through the neck. Alternatively, the inner surface of the sidewall 322 may include features, e.g., snap rings or protrusions, that are configured to pass over and secure to a neck of a vessel to close an opening of the vessel passing through the neck. The cover 323 may define one or more ports 326 therethrough with each port 326 receiving a conduit 340 therethrough. The conduits 340 may be sealingly engaged by the elastomeric seal 330. In some embodiments, the cover 323 is a solid disc and does not include a port 326.

With particular reference to FIG. 11, the body 320 also includes a lattice 324 extending from the cover 323 and positioned within the sidewall 322. As shown, the lattice 324 is also connected to the sidewall 322; however, in some embodiments, the lattice 324 may be spaced apart from the sidewall 322. The lattice 324 extends from the cover 323 a portion of the length of the sidewall 322 and is configured to receive an elastomer to form the elastomeric seal 330. The lattice 324 may define portions of the ports 326 passing through the cover 323 and receive portions of the conduits 340 therethrough. The structure of the lattice 324 is substantially similar to the structure of the lattice 24 detailed above with respect to gasket 10.

The sidewall 322, the cover 323, and the lattice 324 are integrally formed with one another. In some embodiments, the sidewall 322, the cover 323, and the lattice 324 are monolithically formed with one another. For example, the sidewall 322, the cover 323, and the lattice 324 may be formed through an additive manufacturing process, e.g., three-dimensional printing. The sidewall 322 and the cover 323 are substantially solid and may be exposed to an external environment after overmolding. Specifically, portions of or the entire sidewall 322 or the cover 323 may not be overmolded with an elastomer. Alternatively, portions of or the sidewall 322 or the entire cover 323 may be overmolded with an elastomer.

The elastomeric seal 330 is disposed within the sidewall 323 and is overmolded with the lattice 324. The elastomeric seal 330 may form a seal with the conduits 340 passing through the ports 326 and secure the conduits 340 within the ports 326. The elastomeric seal 330 may be configured to form a seal with a neck of a vessel received within the sidewall 322 and form a seal about an opening of the vessel passing through the neck.

The lattice 324 may improve a quality of a seal formed between the elastomeric seal 330 and a conduit 340 or between the elastomeric seal 330 and the neck of a vessel. For example, the lattice 324 may improve extrusion resistance of the elastomeric seal 330 into the ports 326 to prevent compression of a conduit 340 within a port 326.

Figure 12:
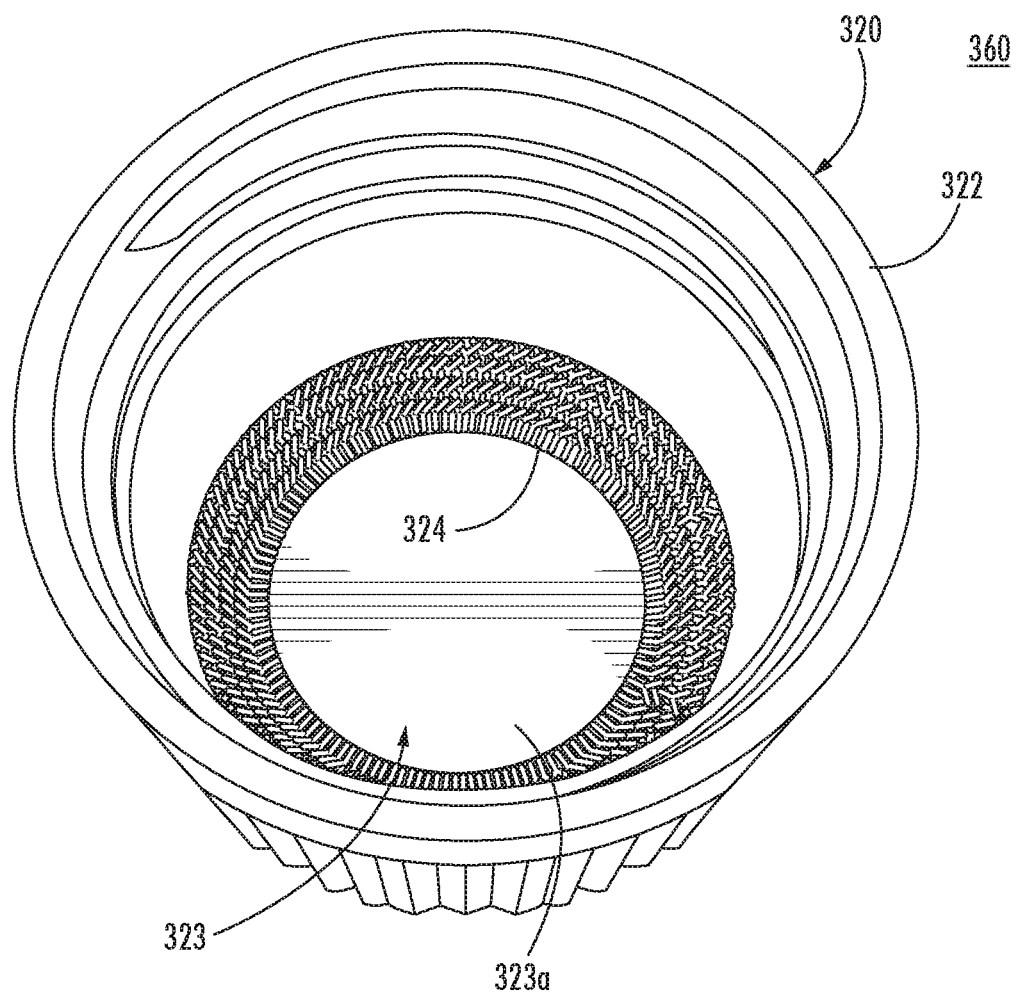
FIG. 12 is a perspective view of another vessel cap provided in accordance with an embodiment of the present disclosure.

Referring now to FIG. 12, a frame 320 of another composite vessel cap 360 is provided in accordance with an embodiment of the present disclosure. The vessel cap 360 is similar to the vessel cap 310 with only the differences detailed herein for brevity.

The frame or body 320 of the vessel cap 360 includes a lattice 324 about a periphery of the cover 323 such that a central portion 323a of the cover 323 does not include the lattice 324. The lattice 324 may be configured to be disposed about a portion of the cover 323 engaged by a neck of vessel. When the frame 320 is overmolded, the elastomeric section (not shown) does not extend over the central portion 323a and is only molded over the portion of the frame including the lattice.

Figure 13:
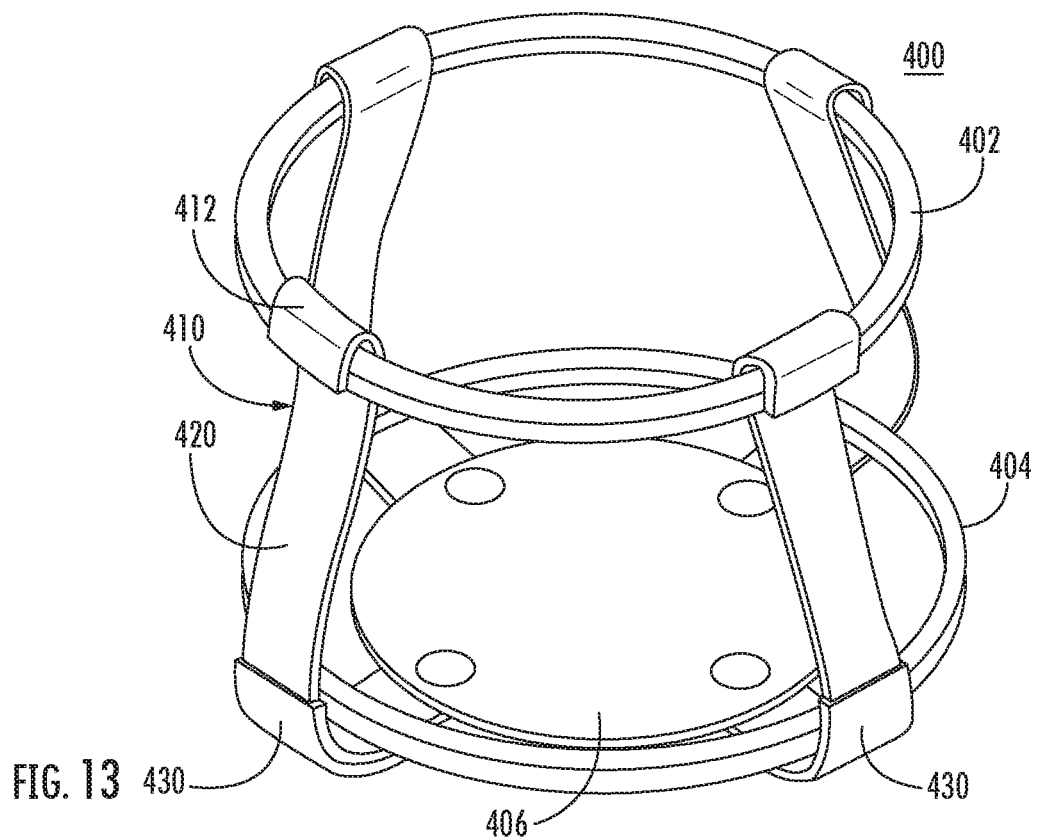
FIG. 13 is a perspective view of a flask stand provided in accordance with an embodiment of the present disclosure.
Figure 14:
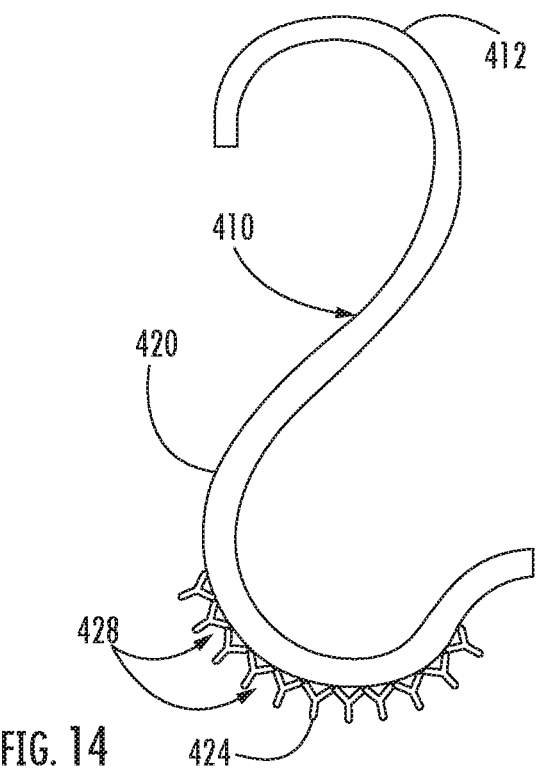
FIG. 14 is a perspective view of a leg of the flask stand of FIG. 13.

Referring now to FIGS. 13 and 14, a shaker flask stand 400 with composite feet 430 is provided in accordance with an embodiment of the present disclosure. The stand 400 includes an upper ring 402, a base ring 404, a base 406, and legs 410. The base ring 404 is secured to the base 406 with the upper ring 402 supported above and axially aligned with the base ring 404 and the base 406. The base 406 is circular in shape and forms a disc. The base ring 404 is secured to the base 406 and may be positioned above the base 406. The base ring 404 may be configured to retain a lower portion of a flask, e.g., an Erlenmeyer flask, as the flask is shaken. The base 406 may be configured to act as a rest for the lower portion of the flask while allowing the lower portion to slide along a surface thereof as the stand 400, and the flask, are shaken.

The legs 410 extend from the base 406 or the base ring 404 to the upper ring 402. Each leg 410 may be secured to the base 406 and in particular to a lower surface of the base 406. Additionally or alternatively, each leg 410 may be secured to the base ring 404. Each leg 410 includes an upper hook 412 that releaseably couples to the upper ring 402. The upper hook 412 allows the upper ring 402 to be secured to the over base 406 after a flask is received on the base 406 and within the base ring 404. The upper ring 402 is configured to prevent a flask received within the stand 400 from tipping or toppling over while the flask is shaken or positioned on a balance. The upper ring 402 may have a diameter equal to a diameter of the base ring 404 or may have a diameter substantially smaller than a diameter of the base ring 404. The diameter of the upper ring 402 may be determined by a diameter of a neck of flask received within the stand 400.

The upper ring 402, the base ring 404, and the base 406 may be constructed of a variety of materials including a metal such as aluminum or steel, a plastic such as a thermoplastic or a thermoset. The upper ring 402, the base ring 404, and the base 406 are rigid and may be coated with a material to reduce impact forces with a flask received within the stand 400.

Each leg 410 includes a body 420 and a molded elastomeric section or foot 430. With particular reference to FIG. 13, the body 420 includes the upper hook 412 at one end portion and includes a lattice 424 at the other end portion opposite the upper hook 412. The lattice 424 extends outward from the lower end portion of the body 420. The lattice 424 may extend entirely to an end of the leg 410 or may terminate spaced apart from the end of the leg 410. The structure of the lattice 424 is substantially similar to the structure of the lattice 24 detailed above with respect to gasket 10.

The body 420 may be integrally formed with the upper hook 412 and the lattice 424 integrally formed with one another. In some embodiments, the entire body 420 is monolithically formed. For example, the body 420 may be formed through an additive manufacturing process, e.g., three-dimensional printing. The body 420 may substantially solid with portions thereof exposed to an external environment after overmolding. Specifically, portions of the body 420 may not be overmolded with an elastomer. Alternatively, the entire body 420 may be overmolded with an elastomer.

The elastomeric section or elastomeric feet 430 are formed by overmolding the lattice 424 with an elastomer. For example, the lower end portion of each leg 410 may be disposed within a mold such that the lattice 424 is disposed within a cavity of the mold. An elastomer is then flowed through the cavity of the mold such that the elastomer flows through voids 428 of the lattice 424 and around the lattice 424. When the elastomer hardens, the elastomeric feet 430 are formed over the lattice 424 such that the elastomeric feet 430 are molded over the lattice 424.

In use, the elastomeric feet 430 are configured to contact a surface and support the stand 400. The feet 430 may be configured to contact a shaker plate or platform and resist movement of the stand 440 relative to the shaker plate or platform. The lattice 424 within each foot 430 may improve durability of the foot 430 compared to a foot without the lattice 424. The lattice 424 within each foot 430 may improve a peel strength between the foot 430 and the body 420 to resist separation or delamination of the foot 430 from the body 420.

Figure 15:
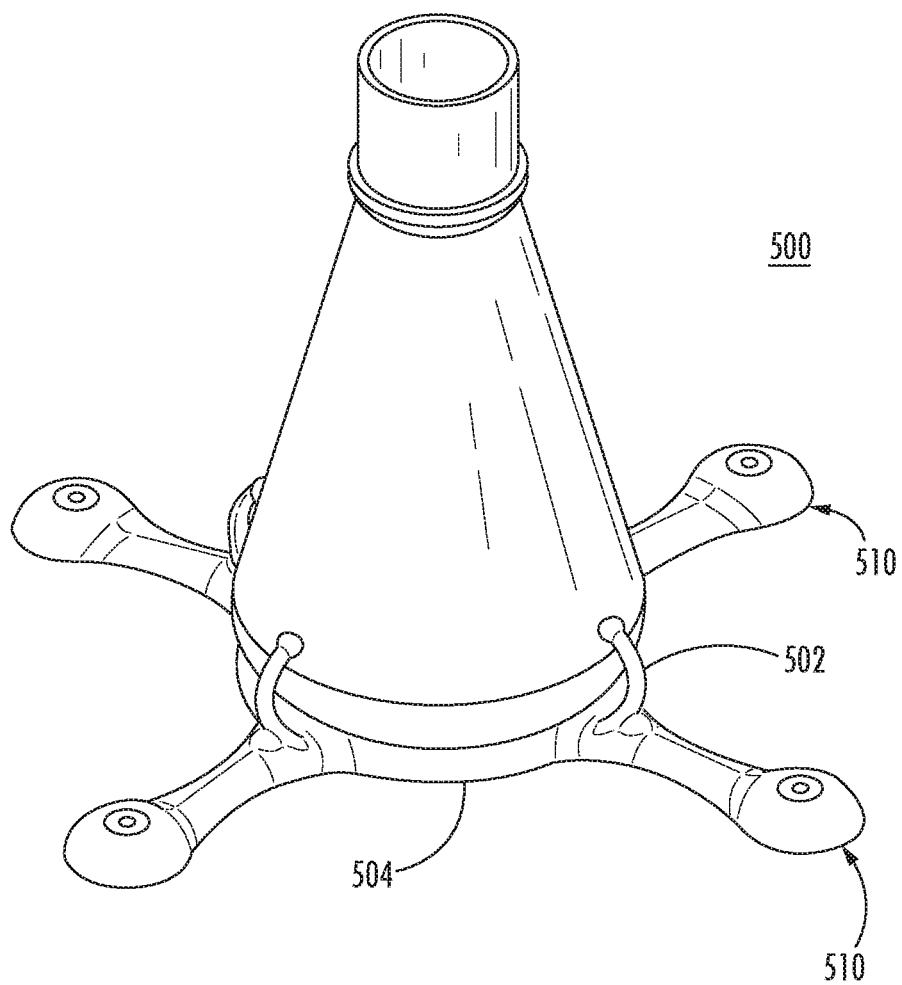
FIG. 15 is a perspective view of another flask stand provided in accordance with an embodiment of the present disclosure.
Figure 16:
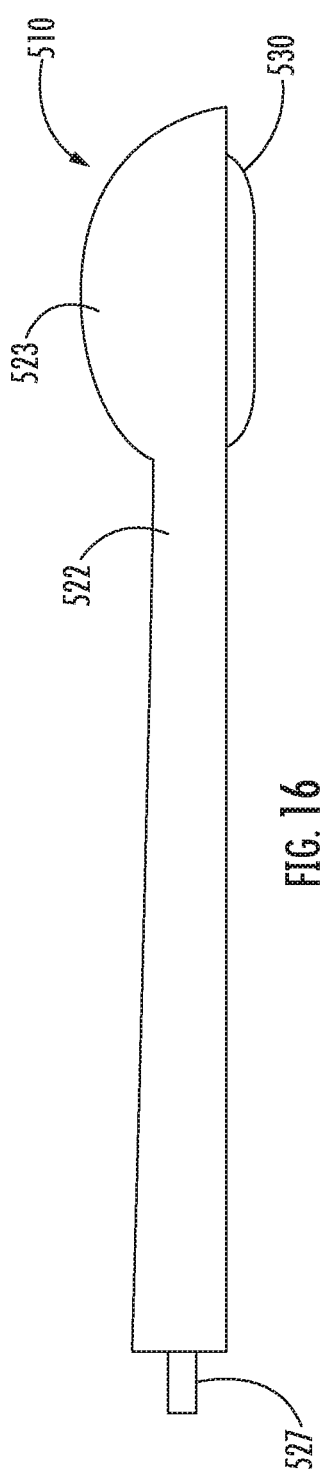
FIG. 16 is a side view of a leg of the flask stand of FIG. 15.
Figure 17:
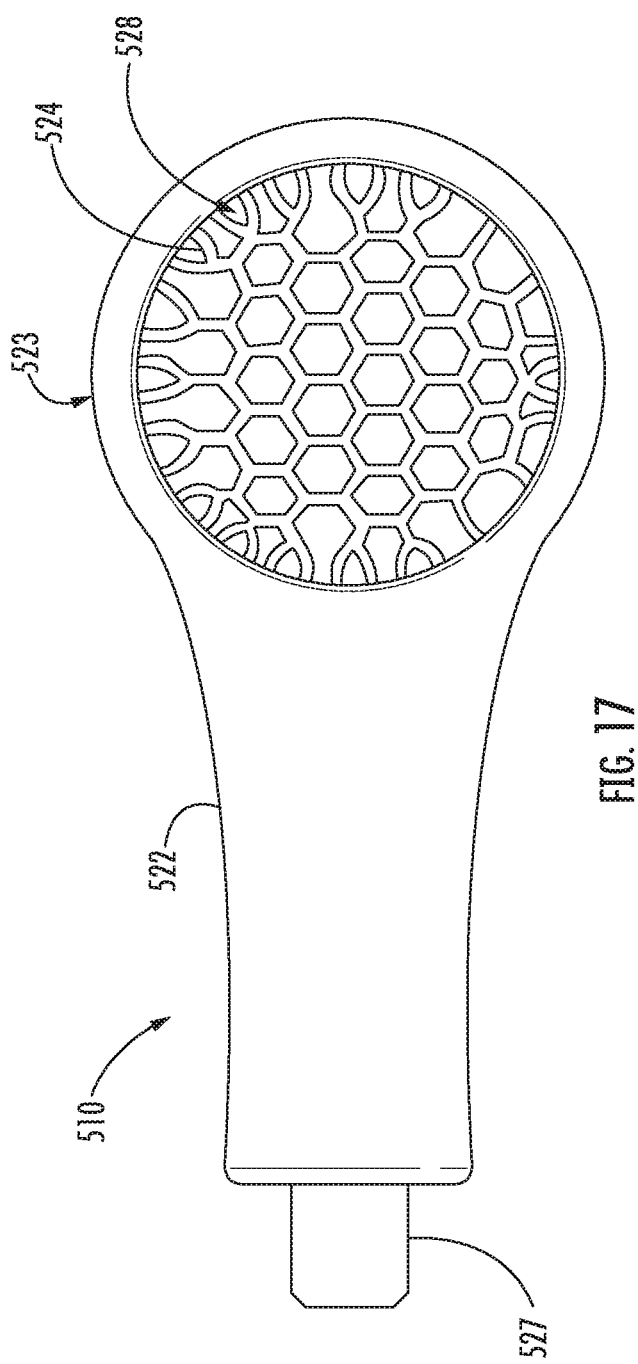
FIG. 17 is a bottom view of a frame of the leg of FIG. 16.

Referring now to FIGS. 15-17, another shaker flask stand 500 with composite feet 530 (FIG. 16) is provided in accordance with an embodiment of the present disclosure. The stand 500 includes flask arms 502, a base ring 504, and legs 510. The flask arms 502 extend from the base ring 504 and are configured to secure a flask to the flask stand 500. Specifically, the flask arms 502 are configured to retain a lower portion of a flask, e.g., an Erlenmeyer flask, as the flask is shaken. The flask arms 502 are configured to prevent a flask received within the stand 500 from tipping or toppling over while the flask is manipulated. The flask arms 502 may extend from the base ring 504 adjacent each of the legs 510. The flask arms 502 may be resilient to flex outward as a flask is received on over the stand 500 and to engage the flask to secure the flask to the flask stand 500. As shown, the stand 500 includes four flask arms 502 and four legs 510 radially spaced about the base ring 504. In some embodiments, the stand 500 includes three flask arms 502 or three legs 510 and in some embodiments, the stand 500 includes more than four flask arms 502 or more than four legs 510. In certain embodiments, the stand 500 includes an unequal number of flask arms 502 and legs 510.

The base ring 504 is configured to act as a rest for the lower portion of the flask while allowing the lower portion to slide along a surface thereof as the stand 500, and the flask, are shaken. The legs 510 extend outward from the base ring 504. Each leg 510 is secured to the base ring 504 by an attachment tab 527 that extends from one end of the leg 510 and is configured to secure the leg 510 to the base ring 504. The base ring 504 may define a recess configured to receive the attachment tab 527 therein. The attachment tab 527 may be secured to the base ring 504 by a fastener, may be secured to the base ring 504 by an adhesive, and/or may be welded, e.g., ultrasonically welded, to the base ring 504.

The flask arms 502 and the base ring 504 may be constructed of a variety of materials including a metal such as aluminum or steel, a plastic such as a thermoplastic or a thermoset. The flask arms 502 and the base ring 504 are substantially rigid and may be coated with a material to reduce impact forces with a flask received within the stand 500.

Each leg 510 includes a frame or body 522 and a molded elastomeric section or foot 530. With particular reference to FIG. 17, the body 522 includes foot portion 523 at an end of the leg 510 opposite the attachment tab 527. The foot portion 523 includes a lattice 524 that extends into the foot portion 523 of the leg 510. The lattice 524 may extend outward from a lower surface of the body 522. The structure of the lattice 524 is substantially similar to the structure of the lattice 24 detailed above with respect to gasket 10.

The body 522 may be integrally formed with the lattice 524. In some embodiments, the entire body 522 is monolithically formed. For example, the body 523 may be formed through an additive manufacturing process, e.g., three-dimensional printing. The body 523 may substantially solid with portions thereof exposed to an external environment after overmolding. Specifically, portions of the body 522 may not be overmolded with an elastomer. Alternatively, the entire body 522 may be overmolded with an elastomer.

The elastomeric section or elastomeric feet 530 are formed by overmolding the lattice 524 with an elastomer. For example, the foot portion 523 of each leg 510 may be disposed within a mold such that the lattice 524 is disposed within a cavity of the mold. An elastomer is then flowed through the cavity of the mold such that the elastomer flows through voids 528 of the lattice 524 and around the lattice 524. When the elastomer hardens, the elastomeric feet 530 are formed over the lattice 524 such that the elastomeric feet 530 are molded over the lattice 524.

In use, the elastomeric feet 530 are configured to contact a surface and support the stand 500. The feet 530 may be configured to contact a shaker plate or platform and resist movement of the stand 500 relative to the shaker plate or platform. The lattice 524 within each foot 530 may improve durability of the foot 530 compared to a foot without the lattice 524. The lattice 524 within each foot 530 may improve a peel strength between the foot 530 and the body 523 to resist separation or delamination of the foot 530 from the body 523.

Figure 18:
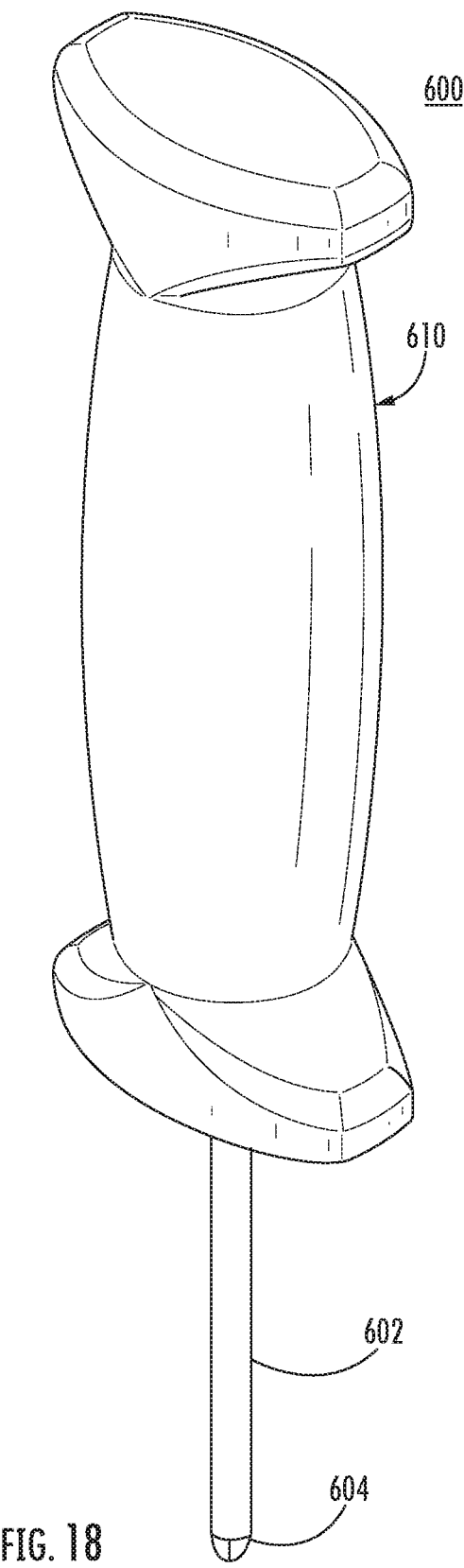
FIG. 18 is a perspective view of a hand tool provided in accordance with an embodiment of the present disclosure.
Figure 19:
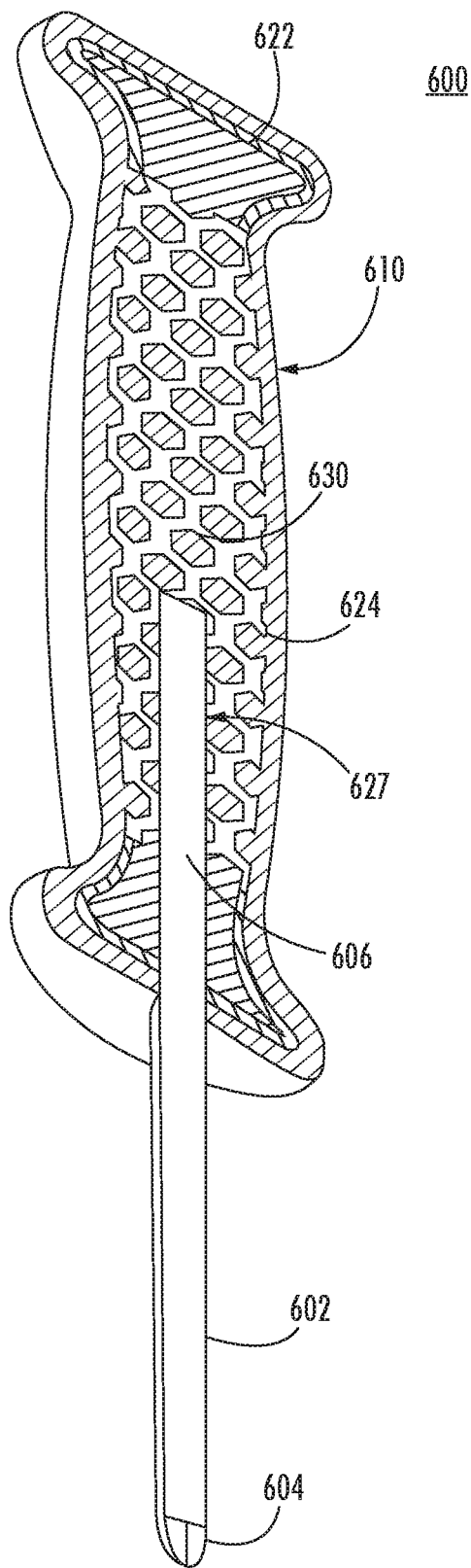
FIG. 19 is a cross-sectional view taken along section line 19-19 of FIG. 18.
Figure 20:
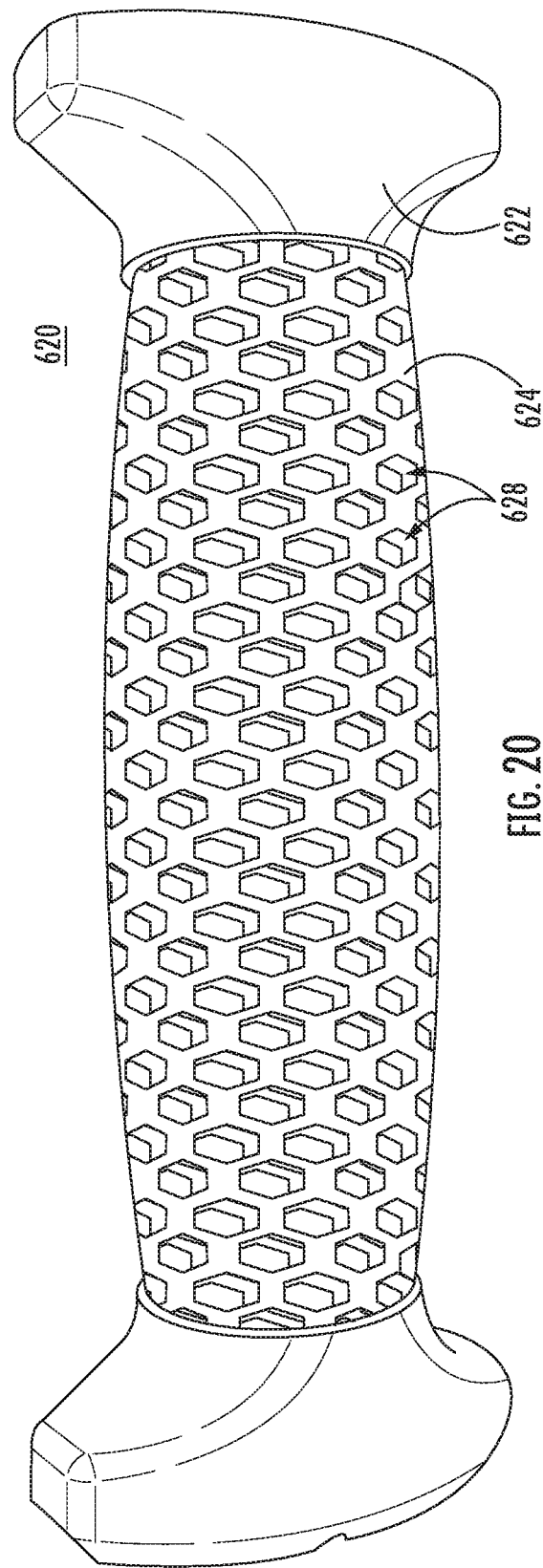
FIG. 20 is a side view of the handle of the hand tool of FIG. 18.

Referring now to FIGS. 18-20, a hand tool 600 including a composite handle 610 is provided in accordance with an embodiment of the present disclosure. As shown, the hand tool 600 is a screw driver; however, it is contemplated that the molded elastomeric handle 610 may be used with a variety of hand tools including, but not limited to, screwdrivers, pliers, surgical tools, knives, kitchen tools, carpentry tools, metal working tools, laboratory equipment, etc.

The hand tool 600 includes a shaft 602 having a working portion 604, and a shank 606. The shank 606 may include securement features that extend radially outward from the shank 606 or are defined within the shank 606, e.g., recesses, and are configured to improve securement of the handle 610 to the shank 606. For example, the shank 606 may include a plurality of wings (not shown) disposed radially about the shank 606. Additionally or alternatively, a surface of the shank 606 may be rough to enhance bonding of the elastomeric section 630 with the shank 606. While the shank 606 of hand tool 600 is shown as a linear shank; in some embodiments, a shank may be curved, form a loop, form a hook, etc. In addition, a shank 606 may be provided without attachment features. The shank 606 may include a plurality of longitudinal grooves (not shown) configured to receive an elastomer during molding.

The handle 610 includes a frame 620 and an elastomeric section 630. The frame 620 is disposed within and overmolded by an elastomer that forms the elastomeric section 630. The frame 620 includes bodies 622 and a lattice 624 that defines a passage 627 therethrough that is configured to receive the shank 606. As shown, the lattice 624 extends between the bodies 622 and forms a web between the bodies 622. In some embodiments, the lattice 624 forms a shell between the bodies 622 and defines an empty core between the bodies 622. The empty core may be filled with elastomer. The lattice 624 may form an outer shell about the passage 627 with elastomer. The structure and formation of the lattice 624 is substantially similar to the structure and formation of the lattice 24 detailed above with respect to gasket 10.

With the lattice 624 positioned over the shank 606, a mold is placed over the shank 606 and the lattice 624. Elastomer is then flowed into a cavity of the mold through and about the lattice 624 and the shank 606 to form the elastomeric section 630 of the handle 610. The elastomer mechanically attaches to the lattice 624 which may improve durability of the handle 610. In addition, the lattice 624 may reinforce the elastomeric section 630 to improve retention and securement to the shank 606.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A flask stand configured to support a flask, the flask stand comprising:
    a base ring configured to support a lower portion of the flask; and
    a plurality of legs, each leg secured to the base ring and extending outward from the base ring, each leg comprising:
        a body having a first end portion secured the base ring and a foot portion opposite the first end portion;
        a lattice formed within the foot portion, the lattice including a plurality of members that form an open-mesh frame defining a plurality of voids between adjacent members of the frame; and an elastomeric foot formed of an elastomer disposed about the lattice and within the voids of the lattice, the elastomeric foot configured to engage a surface to support the body relative to the surface.

2. The flask stand according to claim 1, wherein the first end portion includes an attachment tab, the attachment tab secured the leg to the base ring.

3. The flask stand according to claim 1, wherein the plurality of legs includes four legs.

4. The flask stand according to claim 1, wherein the body and lattice of each leg is monolithically formed with one another.

5. The flask stand according to claim 1, wherein each void of the plurality of voids sized in a range of 0.05 mm to 5 mm.

6. The flask stand according to claim 1, wherein the elastomeric section comprises a thermoset elastomer or a thermoplastic elastomer.

7. The flask stand according to claim 1, further comprising a plurality of flask arms, each flask arm extending from the base ring and configured to secure the lower portion of the flask to the base ring.

8. A method of manufacturing a flask stand, the method comprising:
positioning a portion of a leg of a flask stand within a cavity of a mold, the leg including a body and a lattice, the portion of the leg within the cavity of the mold including at least the lattice, the lattice including a plurality of members that form an open-mesh frame defining a plurality of voids between adjacent members of the frame; and
flowing an elastomer into the cavity of the mold with the elastomer flowing through the voids of the lattice and about the lattice.

9. The method according to claim 8, further comprising additively manufacturing the lattice.

10. The method according to claim 8, further comprising additively manufacturing the body and the lattice as a monolithic structure.

11. The method according to claim 8, further comprising three-dimensionally printing the body and the lattice.

12. The method according to claim 11, wherein three-dimensionally printing the lattice includes the lattice comprising a cross-linked cyanate ester or a cross-linked polyurethane.

13. The method according to claim 8, wherein positioning the portion of the leg within the cavity of the mold includes the plurality of voids being sized in a range of 0.05 mm to 5 mm.

14. The method according to claim 8, wherein flowing the elastomer into the cavity of the mold occurs without the lattice being surface treated.

15. The method according to claim 8, wherein flowing the elastomer includes flowing a liquid elastomer.

16. The method according to claim 15, wherein flowing the liquid elastomer includes flowing a liquid silicone or a liquid perfluoropolyether.

17. The method according to claim 8, further comprising securing the leg to a base ring.

18. The method according to claim 17, wherein securing the leg to the base ring includes inserting an attachment tab of the leg into a recess defined in the base ring.

19. A flask stand configured to support a flask, the flask stand comprising:
a base configured to support the flask; and
a support structure configured to support the base above a surface, the support structure including a first support comprising:
a body having a first end portion secured the base and a second end portion opposite the first end portion;
a lattice formed within the second end portion, the lattice including a plurality of members that form an open-mesh frame defining a plurality of voids between adjacent members of the frame; and
an elastomeric foot formed of an elastomer disposed about the lattice and within the voids of the lattice, the elastomeric foot configured to engage a surface to support the body relative to the surface.

20. The flask stand according to claim 19, wherein the support structure includes a second support.

* * * * *